United States Patent [19]

Bishop et al.

[11] Patent Number: 4,841,243
[45] Date of Patent: Jun. 20, 1989

[54] SIDE-LOOKING SPEED SENSOR

[75] Inventors: Eugene R. Bishop, Fort Lauderdale; Matthew L. Schneider, Margate, both of Fla.; Hermann Rosshirt, Bristol, Conn.

[73] Assignee: North American Philips Corp., New York, N.Y.

[21] Appl. No.: 882,801

[22] Filed: Jul. 7, 1986

Related U.S. Application Data

[63] Continuation-in-part of Ser. No. 718,307, Apr. 1, 1985, abandoned.

[51] Int. Cl.⁴ .................. G01P 3/48; H02K 17/42
[52] U.S. Cl. ..................... 324/174; 324/207; 324/173; 340/870.31
[58] Field of Search .............. 340/870.31; 310/168; 336/30, 45; 324/173, 174, 179, 225, 207, 208

[56] References Cited

U.S. PATENT DOCUMENTS

| | | | |
|---|---|---|---|
| 3,187,314 | 6/1965 | Neergaard | 340/870.31 |
| 3,521,158 | 7/1970 | Morrow | 324/225 |
| 3,721,968 | 3/1973 | Gee | 340/870.31 |
| 3,761,751 | 9/1973 | Fink | |
| 3,986,118 | 10/1976 | Madigan | 324/174 |
| 3,998,298 | 12/1976 | Fleagle | |
| 4,085,617 | 4/1978 | Langberg | 336/30 |

FOREIGN PATENT DOCUMENTS 0639001 12/1978 U.S.S.R. .................. 340/870.31

Primary Examiner—R. J. Eisenzopf
Assistant Examiner—Jose M. Solis
Attorney, Agent, or Firm—F. Brice Faller

[57] ABSTRACT

An elongated generally cylindrical speed sensing device for sensing the speed of a toothed wheel to one side of the device, the device axis being transverse to the wheel axis and the device being generally tangential to the wheel. An elongated soft magnetic pole piece is surrounded by a coil coaxial with the pole piece, and a laterally extending circular symmetrical pole piece projection extends past an end of the coil to a diameter at least equal to the outside diameter of the coil. An axially magnetized permanent magnet abuts one end of the elongated pole piece. The device housing has rotationally symmetrical mounting surfaces coaxial with the magnetic axis so that angular alignment in installation is not required.

18 Claims, 3 Drawing Sheets

SIDE-LOOKING SPEED SENSOR

BACKGROUND OF THE INVENTION

1. Field of the Invention

The invention relates to variable reluctance speed sensing devices and is particularly useful in such devices used with vehicle engines and transmissions.

Variable reluctance speed sensing devices are widely used for sensing the speed of a rotating or moving part. For example, they are used to sense the speed of a rotating shaft to provide a tachometric signal which may be used to control an engine or vehicle speed display. The same sensor may also provide synchronization information for injection of fuel or triggering an ignition spark.

In vehicles, a common speedometer drive includes a worm gear coupling to a flexible shaft. Typically, the coupling is inserted through a threaded hole whose axis is generally tangential with a rotating gear; or the sensor is inserted through a smooth bore until a shoulder and an axial locating surface abut, and an internally threaded cap is turned down over external threads on the transmission to hold the speedometer cable in place. Known variable reluctance speed sensors cannot readily be used as replacement items with these arrangements, because the known sensors sense fields which are parallel to the sensor axis.

2. Description of the Prior Art

A typical variable reluctance sensor has an elongated pole piece made of a soft magnetic material (i.e., one with low remanence), which extends through a coil and has a permanent magnet disposed at one axial extremity of the pole piece. The other axial extremity of the elongated pole piece is axially spaced by a relatively small gap from the teeth of a flywheel or other gear whose rotational speed is to be sensed. Thus, at any specific time either one of a plurality of teeth, or a space between adjacent teeth, of a ferrous toothed wheel is opposite the pole piece. The passage of each tooth by the pole piece produces an increase of the flux coupling the coil, thereby generating an alternating voltage in the coil. The frequency of this voltage is utilized to measure the speed of rotation of the ferrous wheel.

Well-known types of such sensors include the constructions shown in FIGS. 1 and 2. These constructions differ in that, in the embodiment of FIG. 2, the magnet end of the pole piece is provided with an enlarged head. This head corresponds generally to the shape of a nail. Because each of these known designs utilize the axial extremity of the elongated pole piece to cooperate with the teeth of the ferrous wheel or gear, they must be oriented generally along a radius line of the wheel or gear. This design cannot be substituted readily in a machine or vehicle which had used a worm gear mechanical sensor.

SUMMARY OF THE INVENTION

An object of the invention is to provide a speed sensing element capable of sensing a ferrous object at the side of the device and moving in a direction parallel to the device axis.

Another object of the invention is to provide a side-looking speed sensor which is equally sensitive in all directions about the device axis, so that it can be screwed or inserted into a hole with no need for angular alignment and locking.

A further object of the invention is to provide a sensor that can be manufactured relatively inexpensively.

According to the invention, for cooperation with an associated wheel having a plurality of spaced magnetic teeth or other low-reluctance locations disposed about the circumference thereof, the sensor includes an elongated pole piece having at least one laterally extending projection at one location, a coil surrounding at least an axial part of the elongated pole piece, and a permanent magnet abutting the elongated pole piece.

Preferably, the device has mounting surfaces which are generally rotation symmetrical and define a device axis, and the elongated pole piece is symmetrical about that axis. The laterally extending projection is a cylindrical section which, because of the symmetry, is coaxial with the rest of the pole piece. This symmetry provides an especially simple installation because there is no requirement for adjusting the angular position of the device about its axis during installation, nor is there any requirement for a specific angular alignment of parts during manufacture and assembly.

The device mounting means may include an external shoulder which determines the axial insertion depth, and thus establishes the location of the laterally extending projection with respect to that surface, in a direction parallel to the insertion direction.

In one aspect of the invention, the laterally extending projection and the permanent magnet are at opposite ends of the elongated portion of the pole piece, with the sensing coil located between them. In this arrangement the approach of a magnetic material such as a gear tooth to the lateral projection causes an increase in flux linkage of the coil.

In another aspect of the invention, the magnet abuts that end of the elongated pole piece from which the projection extends laterally, so that approach of a magnetic object such as a gear tooth to the projection reduces flux linkage in the coil.

According to a third aspect of the invention, oppositely poled axial permanent magnets abut each end of the elongated pole piece, the lateral projection being at one end of the pole piece where one of the magnets abuts. For a given coil and other related dimensions, this form of the invention provides an especially high output voltage.

In all of the above-described forms of a sensor according to the invention, the lead wires to the sensing coil are preferably arranged to exit the sensor in an axial direction; but a further advantage of the rotational symmetry of the magnetic structure is utilized when it is desired that a lead wire cable exit the sensor at right angles to the device axis, because then there is no need to orient this direction with respect to any other parts of the sensor itself.

DESCRIPTION OF THE PREFERRED EMBODIMENTS

Figure 1:
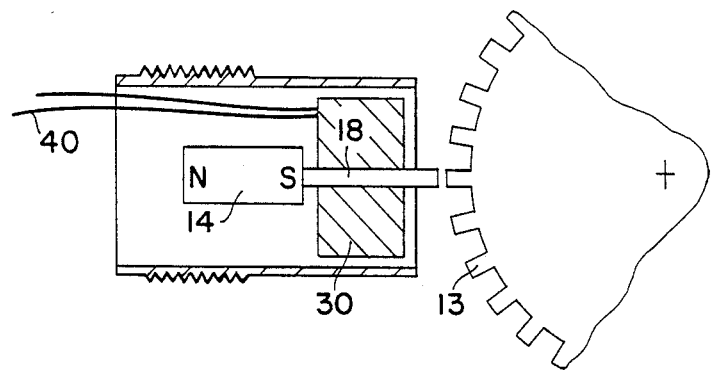
FIG. 1 is a partially schematic longitudinal section of a prior art sensor.
Figure 2:
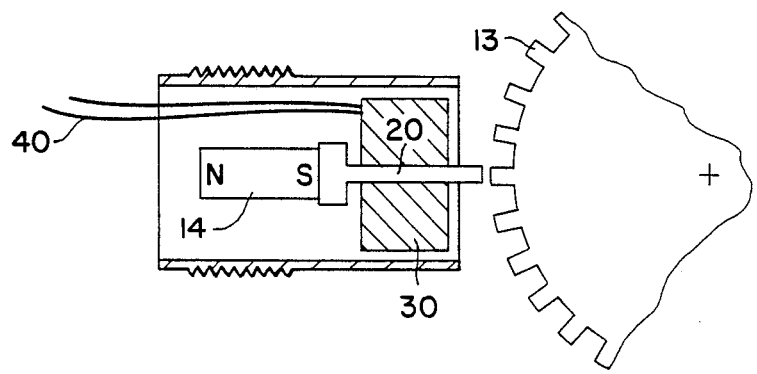
FIG. 2 is a partially schematic longitudinal section of a different prior art sensor, having an enlarged head.

Prior art sensors 10, 12 shown in FIGS. 1 and 2 each have a permanent magnet 14 disposed in end-abutting relationship with an elongated pole piece. The pole piece 18 shown in FIG. 1 is entirely cylindrical, and preferably projects beyond the end of the generally cylindrical frame 11 which, as shown here, has a plain threaded mounting. In this embodiment, the axial clearance from the tip of the pole piece 18 to a gear or toothed wheel may be adjusted by screwing the sensor inward or outward, and using a lock nut to hold it in the adjusted position. The axially magnetized permanent magnet 14 may be cylindrical, with a diameter sufficiently small to permit the leads 40 from the coil 30 to pass by it, or the magnet may be of some other cross-section which provides space for the leads 40.

Figure 7:
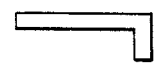
FIG. 7 is a longitudinal section of a pole piece having a projection which is not rotationally symmetrical.

The prior art sensor shown in FIG. 2 is generally similar to that of FIG. 1, except that it incorporates a "nail head" pole piece 20 having the enlarged head abutting the permanent magnet. This enlarged section provides better coupling from the permanent magnet, and may provide superior mounting strength for the permanent magnet, but it is not effective as a side sensor for magnetic objects passing in a direction parallel to the sensor axis.

Where the teeth to be sensed are quite wide in the direction of the axis about which the gear or wheel rotates, sensitivity can be improved if the pole piece end adjacent the teeth has a lateral projection as shown in FIG. 7, or a symmetrical "T" shape. Either of these arrangements, however, causes a great loss of sensitivity if the sensor is installed with the sensor rotated such that the lateral projection is not parallel with the gear or wheel rotation axis.

The sensors according to the invention, as shown in FIGS. 3-6, each have a generally cylindrical elongated portion 22 about which the coil 30 is wound, and a circular cylindrical projection or disc portion 24 which defines the axial location of maximum sensitivity to the passage of a tooth on a gear or wheel whose axis is off to the side of the sensor and is transverse to the sensor axis. This embodiment shows a sensor sleeve housing 33 having an external thread 33a for retaining the sensor in the installed position, and a thin wall at least over the disc portion 24. The actual position of the lateral projection 24 with respect to the teeth 13 may be adjusted over a small distance, for example to provide a synchronizing adjustment, by screwing the sensor inward or outward with respect to a tapped hole in the apparatus in which the sensor is installed, and utilizing a lock nut engaging the threads 33a to maintain this alignment. This embodiment then provides the advantage that such synchronization can be readily obtained, without any change in the sense or strength of the signal received from the coil 30, because of the rotational symmetry of the projection 24.

A larger adjustment in the distance of insertion, by screwing the sensor inward or outward, may be made to reduce the signal strength below the maximum by increasing the clearance from the path of the teeth 13.

It will be clear that the housing sleeve 33 may be made of any non-magnetic material, such as brass or aluminum, or a plastic having strength and temperature resistance sufficient for the particular installation.

Figure 3:
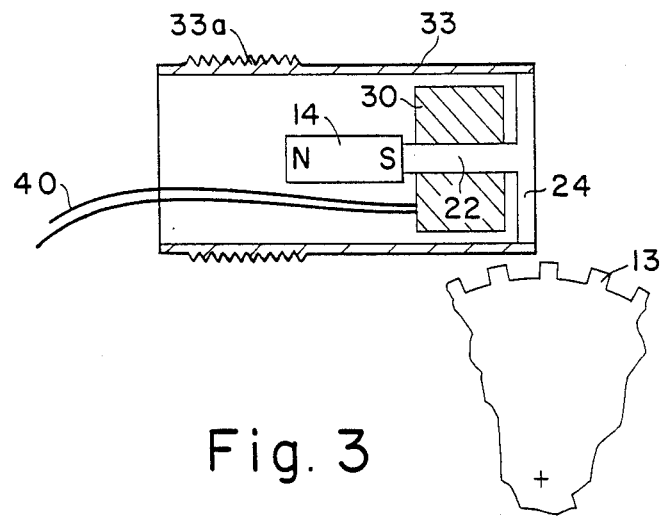
FIG. 3 is a partially schematic longitudinal section of a first variable reluctance sensor in accordance with the invention.
Figure 4:
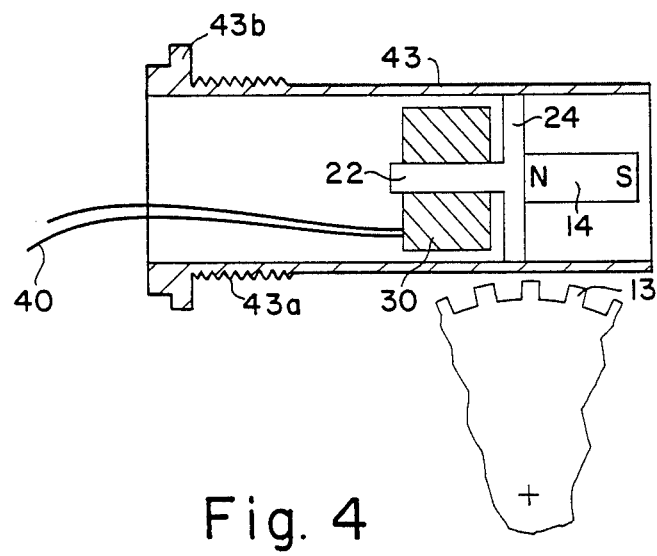
FIG. 4 is a partially schematic longitudinal section of a second variable reluctance sensor in accordance with the invention.

The embodiment of FIG. 4 may be manufactured using internal parts which are identical to those of FIG. 3, but are assembled in a different order. Thus, the permanent magnet 14 abuts the end face of the projection 24, rather than the free end of the elongated pole piece 22. This configuration provides a higher output voltage than that of FIG. 3, but has the disadvantage for some applications that the sensor projects beyond the radial line or planes of the location where the projection 24 is closest to the teeth 13 to be sent. This embodiment uses a housing sleeve 43 which is again retained by an external thread 43a, but has a shoulder 43b providing a fixed stop to determine the location of the projection 24 with respect to a registration surface on the apparatus into which the sensor is installed.

Figure 5:
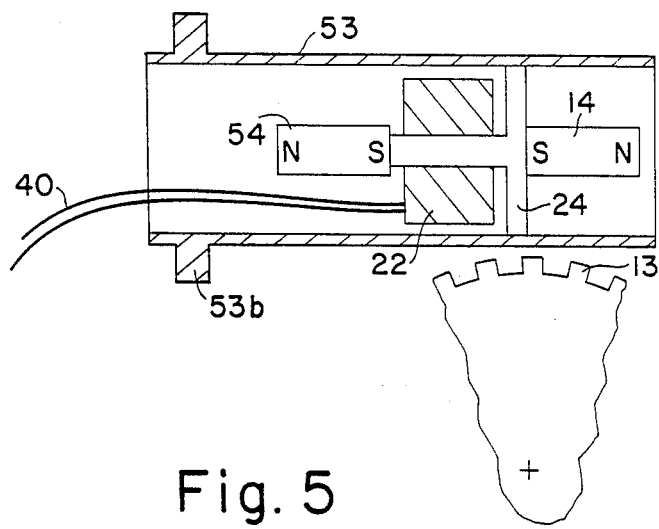
FIG. 5 is appartially schematic longitudinal section of a third variable reluctance sensor in accordance with the invention, having two opposed magnets.

The embodiment of FIG. 5 utilizes the same internal structure as that of FIG. 4, except for the addition of a second axially poled permanent magnet 54, abutting the free ends of the elongated pole piece 22 and poled opposite to that of the magnet 14. Although this embodiment requires one additional internal part compared to that of FIG. 4, for other dimensions being equal, it will have a higher output voltage. The housing sleeve 53 shown herein is a particularly simple form, having a plane shoulder 53b for determining the axial location of the laterally extending pole piece 24.

Figure 6:
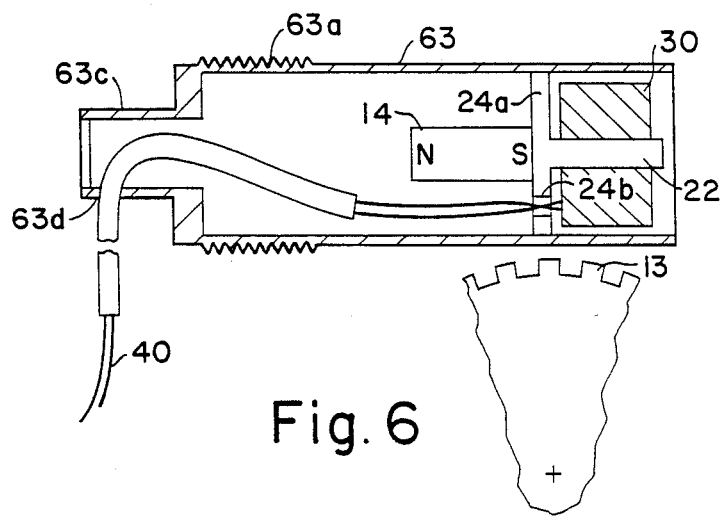
FIG. 6 is a partially schematic longitudinal section of a fourth variable reluctance sensor in accordance with the invention.

The embodiment of FIG. 6 is very like that of FIG. 4, except that the internal parts have been turned end for end axially. This embodiment has the advantage that the coil 30 is entirely within the apparatus and thus may be better shielded from disturbing magnetic influences originating from outside the apparatus. However, the laterally projecting pole piece 24a differs by reason of requiring a hole 24b through which the leads 40 pass. To permit radial exiting of the leads 40, the housing sleeve 63 has a threaded portion 63a, and an axially extending portion 63c. The portion 63c has a reduced outside diameter to allow passing a lock nut over it, with the lead wires exiting radially through an opening 63d.

Because of the difference in the relative positioning of the permanent magnet and the laterally extending pole piece 24, for a given coil 30 and peripheral speed and clearance to the teeth 13, the outputs from the coil 30 in the different embodiments will vary substantially. The embodiment of FIG. 3, which does not require extension into the apparatus any deeper than the location where the projection pole piece 24 is closest to the teeth 13, has the lowest output, for example 310 millivolts for a given configuration. For this same coil, and spacing, the embodiments of FIGS. 4 and 6 have an output of approximately 480 millivolts, and the embodiment of FIG. 5 has an output of 860 millivolts.

It will of course be clear to those of ordinary skill that various mounting techniques for the housing sleeve may be selected to suit the particular installation, without regard to whether the internal parts follow the embodiments of FIGS. 3, 4, 5 or 6. Many other variations will also be possible, while retaining the advantage of the invention; for example, the elongated pole piece portion 22 may have a nail head at the magnet end, when it is otherwise assembled according to the configuration of FIG. 3 or FIG. 5. The relative axial length of the projecting pole piece 24 may be selected to an optimum value based on the angular width of the teeth 13, the spaces between the teeth, and the clearance from the teeth 13. Thus, the scope of the invention is to be measured by the appended claims.

What is claimed:

1. A side-looking speed sensing device, for sensing the passage of magnetizable elements past a side of the device, comprising:
    an elongated pole piece made of a soft magnetic material, defining an axis,
    a coil surrounding said elongated pole piece, substantially coaxial therewith, having a given maximum outside diameter,
    a rotationally symmetrical pole piece made of soft magnetic material, extending radially from and coaxial with said elongated pole piece, and having an outside diameter at least equal to said maximum diameter, and
    an axially magnetized permanent magnet substantially coaxial with an abutting one of said pole pieces, said permanent magnet being of substantially smaller cross-section than said rotationally symmetrical pole piece.

2. A device as claimed in claim 1, characterized in that said elongated pole piece and said rotationally symmetric pole piece are each circular cylindrical.

3. A device as claimed in claim 1, characterized in that said rotationally symmetrical pole piece is arranged, in the axial direction, between said coil and said permanent magnet, said permanent magnet abutting said rotationally symmetrical pole piece.

4. A device as claimed in claim 3, characterized in that said permanent magnet is a first permanent magnet poled in a given axial direction, and comprising a second permanent magnet poled in the opposite axial direction, said second permanent magnet abutting an end of said elongated pole piece remote from said first permanent magnet.

5. A side-looking speed sensing device, for sensing the passage of magnetizable elements past a side of the device, comprising
    an elongated pole piece made of a soft magnetic material, defining an axis,
    a housing having at least a portion formed as a non-magnetic thin walled circular cylindrical sleeve defining an axis,
    an elongated pole piece made of a soft magnetic material, disposed within said housing coaxially with said axis,
    a coil surrounding said elongated pole piece, substantially coaxial therewith, having a given maximum outside diameter,
    a rotationally symmetrical pole piece made of soft magnetic material, extending radially from and coaxial with said elongated pole piece, and having an outside diameter at least equal to said maximum diameter, fitted closely within said sleeve, and
    an axially magnetized permanent magnet substantially coaxial with and abutting one of said pole pieces, said permanent magnet being of substantially smaller cross-section than said rotationally symmetrical pole piece.

6. A device as claimed in claim 5, characterized in that said elongated pole piece and said rotationally symmetric pole piece are each circular cylindrical, and said housing comprises external mounting means for mounting the device in an apparatus for sensing the passage of magnetic elements within the apparatus, said mounting means consisting of substantially rotational symmetric surfaces coaxial with said axis.

7. A device as claimed in claim 6, characterized in that said rotationally symmetrical pole piece is arranged, in the axial direction, between said coil and said permanent magnet, said permanent magnet abutting said rotationally symmetrical pole piece.

8. A device as claimed in claim 6, characterized in that said permanent magnet is a first permanent magnet poled in a given axial direction, and comprising a second permanent magnet poled in the opposed axial direction, said second permanent magnet abutting an end of said elongated pole piece remote from said first permanent magnet.

9. A device as claimed in claim 6, characterized in that said mounting means comprises an external annular shoulder, coaxial with said axis, for defining the relative axial position of said rotationally symmetric pole piece.

10. A device as claimed in claim 9, characterized in that said rotationally symmetrical pole piece is arranged, in the axial direction, between said coil and said permanent magnet.

11. A device as claimed in claim 9, characterized in that said permanent magnet is a first permanent magnet poled in a given axial direction, and comprising a second permanent magnet poled in the opposite axial direction, abutting an end of said elongated pole piece remote from said first permanent magnet, said second permanent magnet abutting said rotationally symmetrical pole piece.

12. An arrangement for detecting the speed of a gear or the like, said arrangement comprising
    a gear or the like having a plurality of magnetizable elements about the circumference thereof, said gear having an axis of rotation located centrally of said elements,
    a speed sensor comprising an elongated pole piece of soft magnetic material defining an axis therethrough between opposed ends thereof, a coil surrounding said elongated pole piece substantially coaxially therewith, a disc-like pole piece extending radially from said elongated pole piece coaxially therewith and having a larger diameter than said coil, and an axially magnetized permanent magnet substantially coaxial with and abutting one of said pole pieces, said device being oriented adjacent the periphery of said gear and transversely thereof so that said disc-like pole piece is proximate to the periphery of said gear and said elements move substantially perpendicular to the plane of said disc-like pole piece when said gear and said disc-like pole piece are most proximate, a tubular housing of non-magnetic material and sized to closely receive said disc-like pole piece therein, said housing receiving said pole pieces coaxially therein.

13. A device as in claim 5 wherein said axially magnetized permanent magnet abuts said elongated pole piece.

14. An arrangement as in claim 12 wherein said elongate pole piece is situated between said disc-like pole piece and said permanent magnet, said permanent magnet abutting said elongate pole piece.

15. An arrangement as in claim 12 wherein said disc-like pole piece is situated between said elongate pole piece and said permanent magnet, said permanent magnet abutting said disc-like pole piece.

16. An arrangement as in claim 12 wherein said permanent magnet is first permanent magnet, said device further comprising a second permanent magnet abutting an end of said elongate pole piece remote from said first permanent magnet, said second permanent magnet being poled in the opposite axial direction.

17. An arrangement as in claim 12 wherein said permanent magnet is substantially cylindrical and of substantially smaller diameter than said disc-like pole piece.

18. A device as in claim 1 wherein said axially magnetized permanent magnet abuts said elongated pole piece.

* * * * *